United States Patent [19]
Tilt

[11] Patent Number: 5,363,481
[45] Date of Patent: Nov. 8, 1994

[54] AUTO SELECTING SCROLLING DEVICE

[75] Inventor: Christopher E. Tilt, Portland, Oreg.

[73] Assignee: Tektronix, Inc., Wilsonville, Oreg.

[21] Appl. No.: 902,250

[22] Filed: Jun. 22, 1992

[51] Int. Cl.⁵ .................................................. G06F 3/14
[52] U.S. Cl. ...................................... 395/156; 395/155; 345/124
[58] Field of Search ............... 395/156, 155, 157, 160; 345/123, 124, 119

[56] References Cited

U.S. PATENT DOCUMENTS

| | | | |
|---|---|---|---|
| 4,479,197 | 10/1984 | Haag et al. | 395/156 X |
| 4,823,283 | 4/1989 | Diehm et al. | 395/156 |
| 4,862,390 | 8/1989 | Weiner | 395/155 |
| 4,896,291 | 1/1990 | Gest et al. | 395/156 |
| 5,155,806 | 10/1992 | Hoeber et al. | 395/157 |
| 5,239,494 | 3/1994 | Saito et al. | 395/156 X |

Primary Examiner—Raymond J. Bayerl
Attorney, Agent, or Firm—Boulden G. Griffith

[57] ABSTRACT

An auto selecting scrolling device is an improved user interface for viewing and making selection of a parameter from a menu. When a device, used to scroll through a menu, is activated the menu appears. A timer with user preset time limit is started. As long as the scrolling device is being used to scroll through the parameters in the menu, the timer is reset. While the scrolling is taking place the parameters are not only highlighted but also magnified. If the menu is no longer being scrolled through, then the timer expires upon attaining the user set limit. When the timer expires, the last highlighted parameter is selected and the menu is closed.

4 Claims, 2 Drawing Sheets

AUTO SELECTING SCROLLING DEVICE

BACKGROUND OF THE INVENTION

The present invention relates to computer based user interfaces, and more particularly to an auto selecting scrolling device to improve and simplify the process of scrolling through an on-screen menu and selecting a desired value.

As instruments have become more complex, so have the user interfaces which accompany them. In order to conserve space on increasingly more complex user interfaces, dedicated knobs and buttons have been replaced with menu driven systems, similar to those found on computers that use a mouse. These systems use a selection device, such as a button, to first select a menu to scroll through. Then a method for scrolling through the menu to the desired highlighted choice is used. Finally, the select button is again used to select the desired parameter. All present systems of this type require the select, scroll, select sequence described, performed via various selection and scrolling means.

The drawbacks associated with present systems are varied. Some instruments are not optimally designed for use with an outboard device such as a mouse so replacement with an on panel device is desirable. Expert users find their selection time slowed, due to the select, scroll, select sequence required in present interfaces. Novice users sometimes lack sufficient information to make a proper choice, due to either long menus, menu choices with abbreviations in them, or numbers that are so small that they are difficult to discern. Therefore, an improved method of viewing the menu and making a selection is desired.

SUMMARY OF THE INVENTION

Accordingly the present invention provides an auto selecting scrolling device as an improved method of viewing a menu and making a selection. When a knob, used to scroll through a menu, is activated or turned the menu appears. A timer with a user preset time limit is started. As long as the knob is being turned the timer is reset. While the knob is being turned different parameters are not only highlighted, as is done in present systems, but also magnified. If the knob is not being turned, then the time limit expires. When the time limit expires, the last highlighted parameter is selected and the menu closes.

Since the time limit may be adjusted by the user, as familiarity with the menu choices increases the selection time limit can be decreased. The result is faster selection for the expert. The timer may be set to lengthy periods of time to allow the novice to gain familiarity with the choices in the menu.

While the menu is being scrolled through, the selection is not only highlighted but also magnified to increase legibility. When magnified, additional information about the highlighted selection is also included in the magnified portion of the screen. This is done to aid the novice in making a selection.

The objects, advantages and novel features of the present invention are apparent from the following detailed description when read in conjunction with the appended claims and attached drawings.

DESCRIPTION OF THE PREFERRED EMBODIMENT

Figure 1:
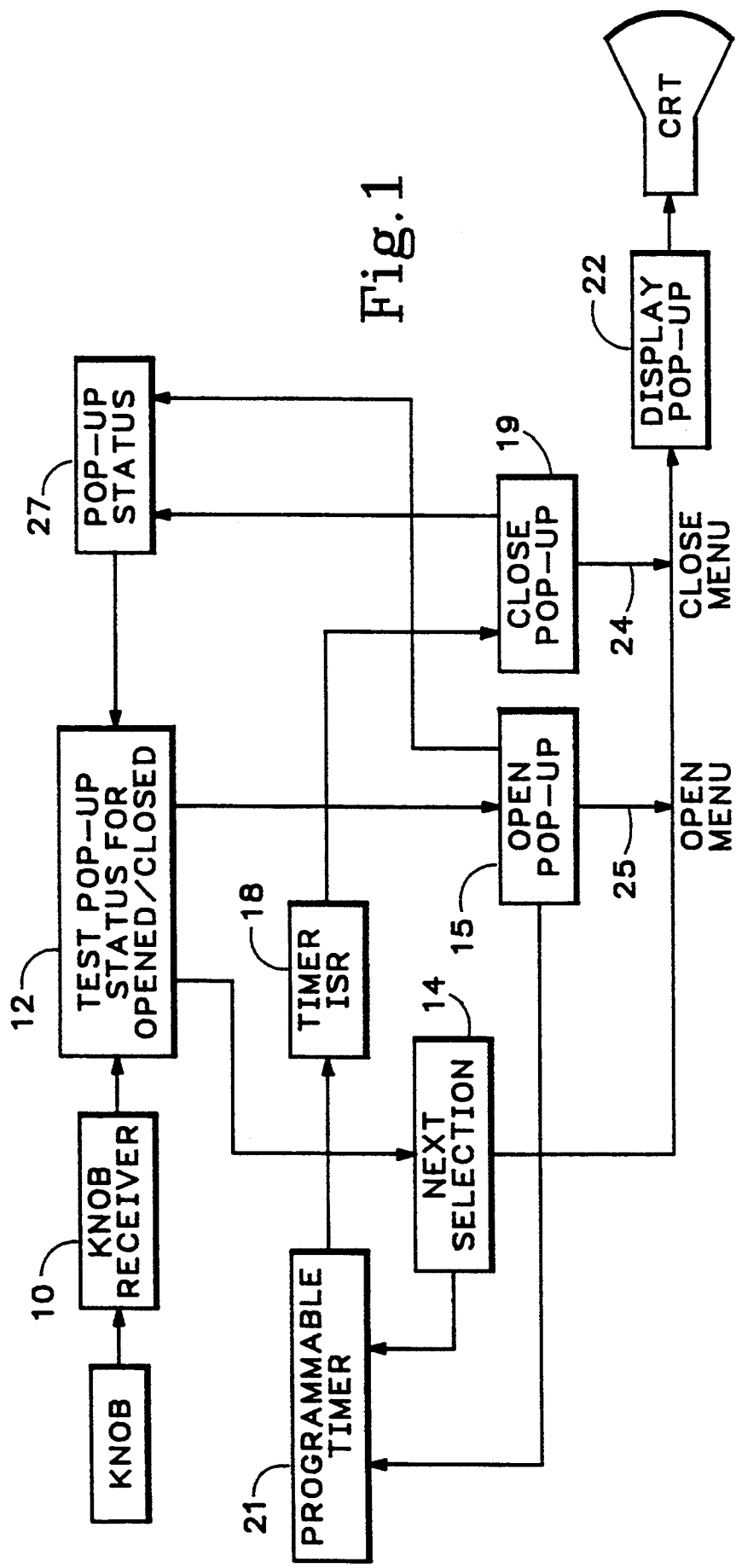
FIG. 1 is a schematic block diagram of a user interface in accordance with the invention to provide the highest possible performance.

The auto selecting scrolling device is illustrated in a block diagram in FIG. 1. In the preferred embodiment of the invention a knob acts as a scrolling device. When the knob receiver 10 detects knob rotation, that input is passed to a software subroutine, similar to that in the appendix, that initiates action based on the current status of the menu. In 12, the menu status is checked to determine whether or not the menu is opened or closed. If the menu is closed then the software opens the menu 15 and displays it on-screen 25. The menu status 27 is updated to a value of opened and the programmable timer 21 is started 17.

As long as the knob is turned, while the menu status is opened, the next selection 14 is scrolled to and highlighted on the display 22. While the knob is turning the timer 21 is continuously reset 20 to its original duration. When the knob is no longer being turned, the timer 21 is permitted to count until it expires and the interrupt service routine 18 closes the menu 19 and changes the menu status to closed 24, taking the menu off the display.

Figure 2:
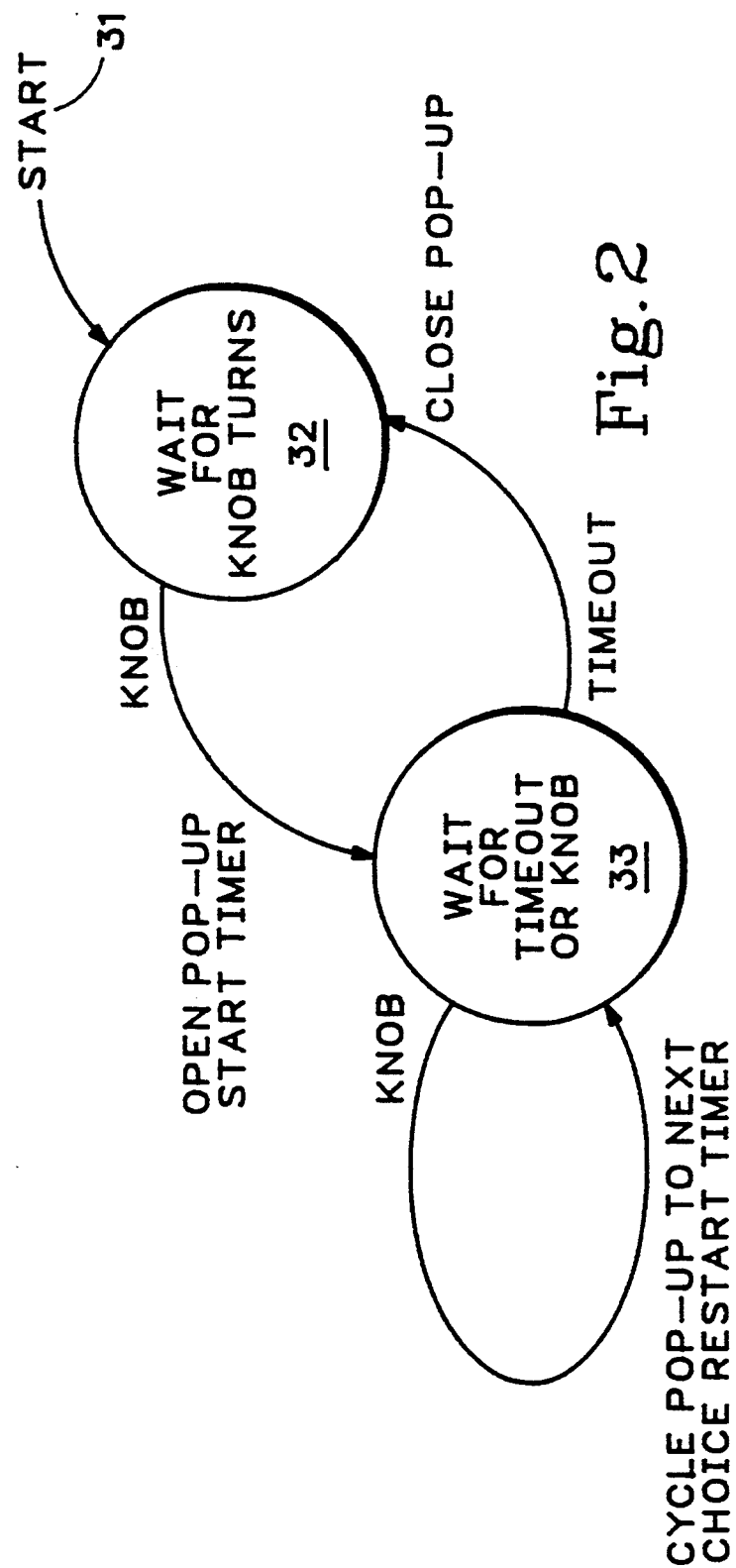
FIG. 2 is a state machine diagram in accordance with the invention, which illustrates the optimal operation of the invention.

FIG. 2 is a state machine diagram of the invention, which illustrates how a subroutine, like that in the appendix, is implemented in the invention. At the start 31 the menu is closed and the system waits for a scrolling device, a knob in our embodiment, to be activated 32. When the knob is turned the menu is opened and the preset timer is started 33. As long as the knob is being turned the timer is restarted. When the knob is no longer being turned the menu is closed and the system returns to its original wait state 32.

Thus the present invention speeds up the selection time for an expert user of an instrument that has a menu system, while providing the novice with more legible, detailed viewing to aid in making a selection. The present invention decreases selection time for the expert; it virtually eliminates the select portions of the presently employed sequence, by using a timer instead of a selection device. It also improves menu legibility by magnifying highlighted selections and including more information about the selection. This is particularly helpful for the novice.

APPENDIX

Pseudo Code
A pseudo coded description
of the auto selection mechanism is listed below.

Definitions:

| | |
|---|---|
| := = | assignment |
| = = | test for equality |
| event | something that occurs while waiting for user input |
| status | pop-up status indicates wether the pop-up menu is active or not |

DO FOREVER:
    BEGIN /* do forever loop */
    event := = get knob__turn or timeout events (wait here for input)
    IF ( event = = knob__turn )

APPENDIX-continued

Pseudo Code
A pseudo coded description
of the auto selection mechanism is listed below.

```
            THEN
                IF ( pop-up status == pop-up is closed )
                    THEN
                        draw the pop-up
                        pop-up status :== open
                        start Timer (Timeout :==
                        ½ second)
                        ENDIF /* pop-up
                        status */
                ELSE /* pop-up status == pop-up is open */
                    THEN
                        advance pop-up selection
                        to next choice
                        restart the Timer
                        (Timeout :== ½ second)
                        ENDIF /* ELSE */
        ELSE /* event == time_out */
            THEN
                close the pop-up
                pop-up status :== closed
                ENDIF /* ELSE */
```

APPENDIX-continued

Pseudo Code
A pseudo coded description
of the auto selection mechanism is listed below.

```
END /* do forever loop */
```

I claim:

1. A method of selecting a parameter from a list of parameters within a menu displayed on a computer based method comprising the steps of:
opening a menu;
starting a timer as the menu is opened;
scrolling through the list of parameters within the menu;
resetting the timer while scrolling;
restarting the timer whenever scrolling ceases; and
selecting the last parameter scrolled to when the timer expires.

2. A method as recited in claim 1, wherein opening the menu comprises the step of activating a scrolling device.

3. A method as recited in claim 1, further comprising the step of presetting a timer to a predetermined time interval.

4. A method as recited in claim 1, wherein each parameter is highlighted and magnified while it is scrolled to.

* * * * *